United States Patent [19]

Gard et al.

[11] Patent Number: 5,563,889
[45] Date of Patent: Oct. 8, 1996

[54] METHOD FOR ESTABLISHING A COMMUNICATION IN A WIRELESS COMMUNICATION SYSTEM

[75] Inventors: Jerald Gard, Algonquin; Daniel McDonald, Cary, both of Ill.

[73] Assignee: Motorola, Inc., Schaumburg, Ill.

[21] Appl. No.: 417,564

[22] Filed: Apr. 6, 1995

[51] Int. Cl.⁶ .................................................. H04J 3/16
[52] U.S. Cl. ............................................ 370/95.1; 370/92
[58] Field of Search ..................... 370/29, 85.7, 85.8,
370/95.1, 95.2, 95.3, 91, 92, 93; 340/825.08,
825.52, 825.54; 415/33.1, 34.1, 54.1, 54.2;
379/63

[56] References Cited

U.S. PATENT DOCUMENTS

| 4,809,268 | 2/1989 | Tejima et al. | 370/95.2 |
|---|---|---|---|
| 4,940,974 | 7/1990 | Sojka | 370/95.2 |
| 5,103,445 | 4/1992 | Ostlund | 370/95.2 |
| 5,297,144 | 3/1994 | Gilbert et al. | 370/95.2 |

Primary Examiner—Douglas W. Olms
Assistant Examiner—Ajit Patel
Attorney, Agent, or Firm—Christopher P. Moreno

[57] ABSTRACT

A console (203), in communication with a zone controller (201) via a communication link (208), sends a communication request that includes an inbound time slot identification, an inbound audio switch identification, and an inbound multiplexer identification to the zone controller. In a first embodiment, it is assumed that the inbound time slot identification not only identifies an inbound time slot, but also a similarly identified outbound time slot as well. In a second embodiment, an outbound time slot identification is explicitly provided as part of the communication request. An outbound audio switch identification and an outbound multiplexer identification may also be provided as part of the communication request. In this manner, the need for the console to have access to all time slots is eliminated, and the complexity of the zone controller and the console can be reduced.

21 Claims, 3 Drawing Sheets

METHOD FOR ESTABLISHING A COMMUNICATION IN A WIRELESS COMMUNICATION SYSTEM

FIELD OF THE INVENTION

The present invention relates generally to wireless communication systems and, in particular, to a method for establishing a communication therein.

BACKGROUND OF THE INVENTION

Wireless communication systems are known to comprise console monitoring positions which communicate to a plurality of communication units. The establishment of such communications is often under the control of a zone controller that allocates system resources to establish the communication. Each console operator position has audio information sent to and received from the appropriate communication units via the wireless communication system.

FIG. 1 is a block diagram of a wireless communication system 100 in accordance with prior art systems comprising a zone controller 101 that controls communication resource allocation, an audio switch 102 that is used to route audio throughout the wireless communication system 100, and a console 103 that is used to communicate with a plurality of communication units 106. Wireless communication resources 107 are transceived between the communication units 106 and the zone controller 101 via base stations/repeaters 105. A multiplexer 104 is used to multiplex multiple audio signals from both the console 103 and the base stations/repeaters 105 into time division multiplexed (TDM) interfaces of the audio switch 102.

Current communication systems, such as that shown in FIG. 1, require that each console in the system (there can be more than one) have complete access to all audio information present in the wireless communication system. As such, consoles filter out necessary inbound audio information (i.e., audio information directed to a console from a communication unit) based on a console user's input. This results in an inefficient utilization of system resources and increased complexity of consoles.

A further consequence of this requirement is that the zone controller needs to keep track of which communication resources, such as wireless communication resources and time slots within an audio switch, are being used by any given console at any time. To this end, the zone controller requires complex control algorithms and extensive databases which are both costly and difficult to implement. Therefore, it would be advantageous to provide a method for establishing communications in wireless communication systems that allows efficient resource utilization and reduces complexity of zone controllers and consoles.

DESCRIPTION OF A PREFERRED EMBODIMENT

The present invention provides a method for establishing a communication involving a console in a wireless communication system. The console, operably coupled to a zone controller via a communication link, sends a communication request to the zone controller, the communication request including an inbound time slot identification. The communication request also includes a console audio type, an inbound audio switch identification, and an inbound multiplexer identification. In a first embodiment of the present invention, it is assumed that the inbound time slot identification not only identifies an inbound time slot, but also a similarly identified outbound time slot as well. In a second embodiment of the present invention, an outbound time slot identification is explicitly provided as part of the communication request. Furthermore, an outbound audio switch identification and an outbound multiplexer identification may also be provided as part of the communication request.

If unable to establish a communication in response to the communication request (due to unavailability of the inbound time slot, for example), the zone controller sends a communication request denial to the console. If, however, the communication is established, the zone controller sends a communication request acknowledgment to the console. After receiving the communication request acknowledgment, the console can receive inbound audio information via the inbound time slot, and can send outbound audio information via the outbound time slot. With this method, the need for the console to have access to all audio slots is eliminated, and the complexity of the zone controller and the console can be reduced.

Figure 1:
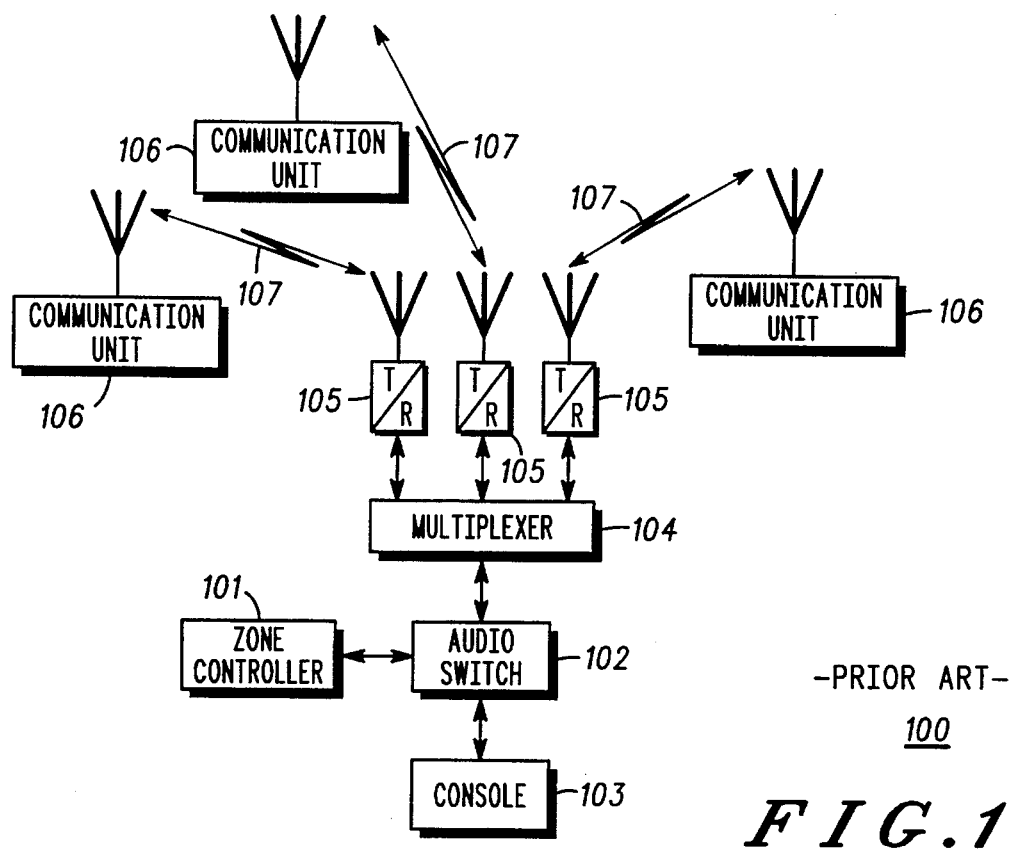
FIG. 1 is a block diagram of a wireless communication system in accordance with prior art systems.
Figure 2:
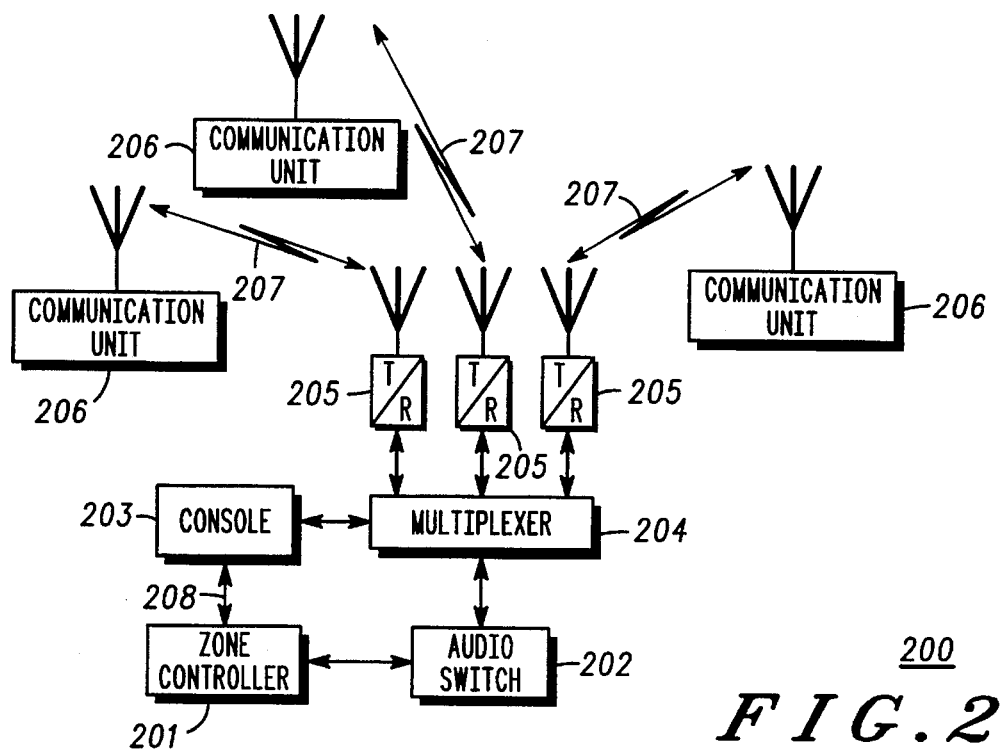
FIG. 2 is a block diagram of a wireless communication system in accordance with the present invention.

The present invention can be more fully described with reference to FIGS. 2–6. FIG. 2 illustrates a wireless communication system in accordance with the present invention. The wireless communication system 200 comprises a zone controller 201, an audio switch 202, a console 203, a multiplexer 204, a plurality of communication units 206, and base stations/repeaters 205. The communication units 206 and base stations/repeaters 205 transceive a limited number of wireless communication resources 207 such that wireless communication is provided within the system 200. It is understood that more than one zone controller 201, audio switch 202, console 203, or multiplexer 204 could be included within the system 200.

The zone controller 201 is operably coupled to the console 203 via a communication link 208. The zone controller 201 is responsible for the maintenance and control of all call activity on the system. The zone controller 201 assigns the appropriate resources and directs the routing of audio information, via the audio switch 202, to be distributed throughout the system 200 to the necessary endpoints, e.g., console 203 and communication units 206.

The audio switch 202, such as an Audio Electronics Bank manufactured by Motorola, Inc., is operably coupled to the zone controller 201 and the multiplexer 204. The audio switch 202 is used to route audio information to the necessary endpoints in the system 200. The audio switch 202 uses time-division multiplexed (TDM) time slots, as known in the art, to route the audio information.

The console 203, which may comprise a single console operator position or a network of console operator positions, is operably coupled to the zone controller 201 and the multiplexer 204. The console 203 provides fixed dispatching of communications throughout the communication system 200. The communication link 208 to the zone controller 201 provides a path used by the console 203 to setup and maintain a communication to the communication units 206.

The multiplexer 204, such as a Siemens Channel Bank, is used to multiplex multiple audio signals into time slots on a TDM interface. That is, the multiplexer 204 combines audio information from multiple sources for transmission via a single link using TDM time slots, as known in the art. Operably coupled to the multiplexer 204, each base station/repeater 205, such as QUANTRO™ base stations by Motorola, Inc., is assigned a dedicated time slot in the TDM interface used to transceive audio within the communication system 200. Likewise, each console operator position of the console 203 is assigned a dedicated time slot used to transceive audio information.

One of the limited number of wireless communication resources 207 functions as a control channel that transceives trunked communication system control information between the zone controller 201 and communication units 206. Furthermore, the communication units, 206, such as ASTRO™ SABRE™ portable radios, are configured into talk groups, as known in the art.

In operation, the console 203 sends a communication request to the zone controller 201, which includes an inbound time slot identification, an inbound multiplexer identification, an inbound audio switch identification and, optionally, an outbound time slot identification, an outbound multiplexer identification, and an outbound audio switch identification (each discussed in further detail below). The zone controller 201, upon receiving the communication request, will respond with either a communication request acknowledgment or a communication request denial.

Figure 3:
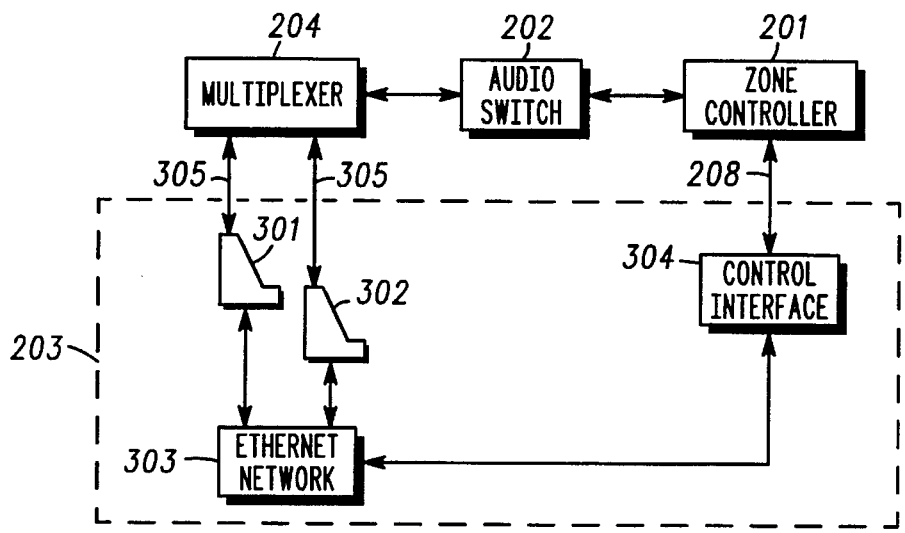
FIG. 3 is a block diagram of an exemplary console arrangement for use in the wireless communication system of FIG. 2.

Assuming the communication request can be established, the zone controller 201 informs the console 203 that the communication can be established, and assigns the necessary base station(s)/repeater(s) 205 required to communicate with the communication units 206. The zone controller 201 instructs the audio switch 202 (in this case, as identified by the inbound and outbound audio switch identifications) to route audio between the assigned base stations/repeaters 205 and the console 203, via the multiplexer 204 (in this case, as identified by the inbound and outbound multiplexer identifications) and the requested time slots as identified by the inbound and outbound time slot identifications. It is understood that since there can be more than one multiplexer and audio switch in the system, the respective inbound and outbound audio switch identifications and inbound and outbound multiplexer identifications could identify two different multiplexers and/or audio switches. The use of the inbound and outbound time slot identifications, selected and provided by the console 203, eliminates the need for the zone controller 201 to control audio switch configuration FIG. 3 shows an exemplary console arrangement for use in the wireless communication system 200 of FIG. 2. The console 203 comprises console operator positions 301–302 that are connected to an Ethernet network 303 and an audio network 305. The console operator positions 301–302 are operably coupled to a control interface 304 via the Ethernet network 303. The control interface 304 is the point of connection to the zone controller 201 for the console 203.

The console operator positions 301–302 allow a dispatcher to communicate with the communication units 206.

The audio network 305, comprising, for example, at least one four-wire analog link if the console operating positions 301–302 are analog consoles or at least one digital link if they are digital consoles, transceives audio information between the console operator positions 301–302 and the multiplexer 204. At the multiplexer 204, each console operator position 301–302 is assigned a transmit (outbound) and a receive (inbound) time slot used to transmit and receive audio information, respectively.

The Ethernet network 303 comprises a known type of communication network that allows computing devices to easily communicate with each other. Control commands, such as call setup, maintenance and tear down commands, from the console operator positions 301–302 are sent to the zone controller in packet form via the Ethernet network 303 and control interface 304. The control interface 304, implementable using a desktop computer or similar device, is operably coupled to the zone controller 201 via the communication link 208, which may also be an Ethernet connection. In addition to routing packetized control commands to the zone controller 201, the control interface 304 also routes control commands to the correct console operator position 301–302 based on data within the control command packets.

For example, a console operator position 301 issues a communication request, described in detail below, over the Ethernet network 303 to the control interface 304. The control interface 304, in turn, routes the communication request to the zone controller 201 via the communication link 208. In response, the zone controller 201 issues a communication request acknowledgment or denial back to the console operator position using the same path. The console operator position 301, assuming that an acknowledgment has been sent, uses the audio interface 305 to transmit and receive audio information within the communication system 200. This process is described in further detail with respect to FIG. 4 below.

Figure 4:
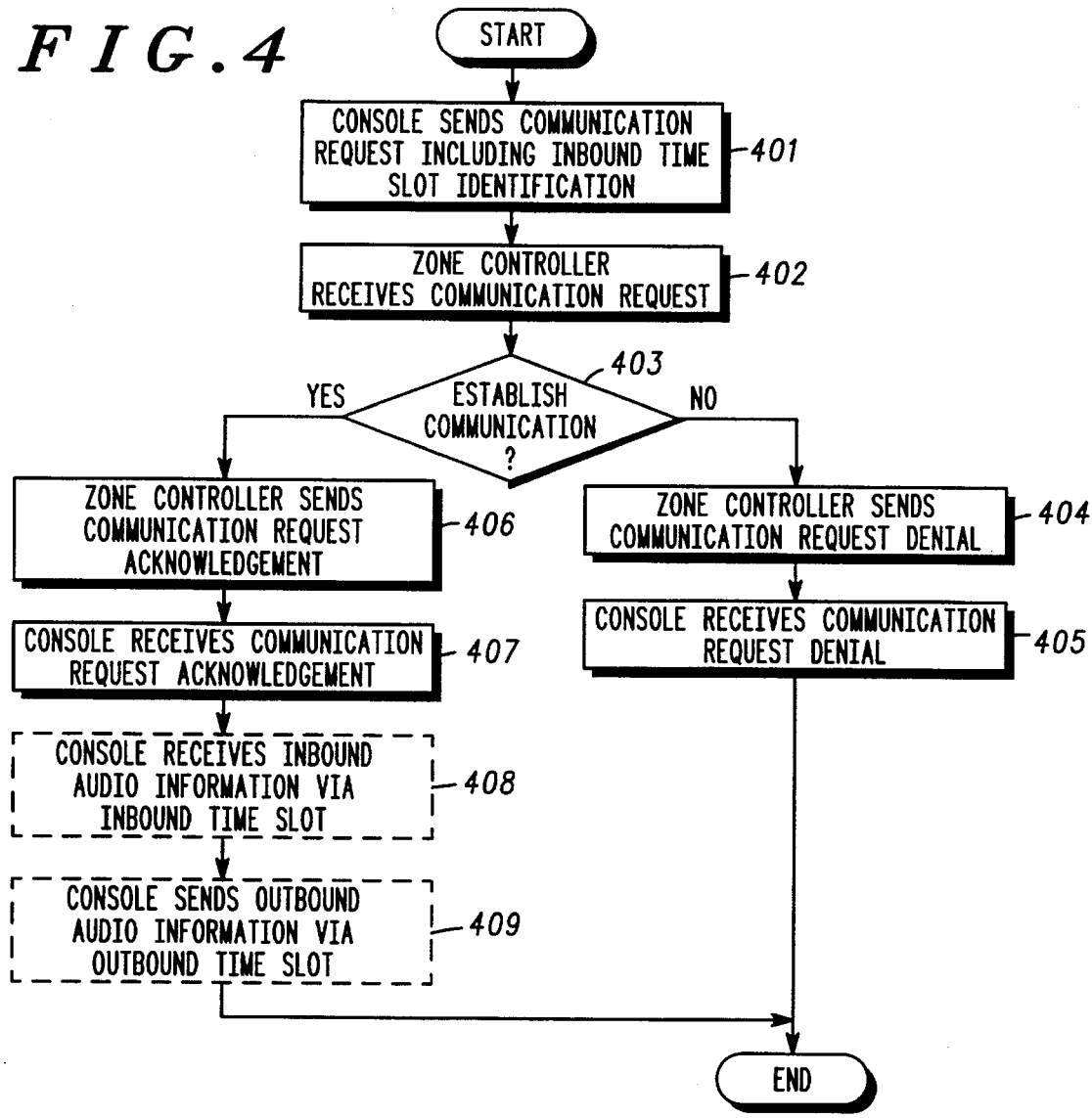
FIG. 4 is a flow chart of a method in accordance with the present invention.

FIG. 4 is a flow chart of a method in accordance with the present invention. At step 401, the console 203 sends a communication request to the zone controller 201. The communication request identifies the calling entity (i.e., a console operator position 301-302) and the target entity (i.e., an individual communication unit or a talk group) of the communication request.

The communication request also identifies those resources to be used in receiving inbound audio information and, optionally, those resources to be used to transmit outbound audio information. The identification of the inbound resources to be used for inbound audio information includes three parts: an inbound audio switch identification, an inbound multiplexer identification, and an inbound time slot identification. The inbound multiplexer identification identifies a particular multiplexer to be used for the inbound audio information. The inbound audio switch identification identifies the audio switch, associated with the identified multiplexer, through which the inbound audio information it to be routed. Finally, the inbound time slot identification identifies a particular time slot within the multiplexer that the audio switch is to use for the inbound audio information. As mentioned above, a similar set of outbound identifications (i.e., relating to an outbound audio switch, an outbound multiplexer, and an outbound time slot) having the same purpose for outbound audio information may also be included.

In addition to the above, the communication request also identifies, via a console audio type, a format that the inbound audio information should take when presented to the console. Currently, consoles are known to support analog and/or compressed, digitized voice. For example, the compressed, digitized voice can be derived from Vector-Sum Excited Linear Prediction (VSELP) or Improved Multi-Band Excitation (IMBE) vocoders, depending upon the system configuration.

At step 402, the zone controller receives the communication request from the console 203 (via the Ethernet network 303 and the control interface 304) and determines, at step 403, whether the requested communication can be established. To this end, the zone controller 201 checks to verify that the calling entity and target entity are authorized to use the system.

If either the calling entity or the target entity, or both, are not authorized, the zone controller 201 determines that a communication request denial should be sent to the console 203 and, at step 404, the communication request denial is sent. At step 405, upon receiving the communication request denial, the console 203 clears the communication request from its internal database and indicates to the user that the communication request was unsuccessful.

Additionally, at step 403, the zone controller 201 determines whether the resources needed to support the requested communication, as identified by the various inbound and outbound identification discussed above, are available. If all of the resources needed to support the call are not available, the zone controller 201 determines that a communication request denial should be sent to the console, as described in steps 404 and 405. For example, the identified inbound/outbound time slots indicated in the communication request must be available. Likewise, a base station/repeater 205 capable of supporting the requested communication must also be available.

If the communication request passes the authorization process and the resources needed to support the request are available, the zone controller 201 sends a communication request acknowledgment to the console 203 at step 406. The communication request acknowledgment indicates to the console 203 that either the request has been granted or that the request has been busied. A busy acknowledgment is generated when the resources needed to support the call are available, but one or more of the needed resources cannot be obtained because they are being used to support other communication requests at the present time. The communication request acknowledgment includes the calling entity and the target entity originally sent in the communication request.

At step 407, the console 203 receives the communication request acknowledgment and indicates to the user that the communication request has either been granted or busied. If the request has been granted, the user can now carry out the communication.

At step 408, the console 203 can optionally begin receiving inbound audio information via the time slot within the audio switch as indicated by the inbound audio switch identification and! the inbound time slot identification. Similarly, the inbound multiplexer identification allows the audio switch to route the inbound audio information to the required multiplexer. The audio switch has a hierarchical architecture where a group of time slots are connected to a multiplexer. Thus, when the communication is established, the inbound audio switch is programmed to provide the inbound audio information to the inbound multiplexer via the inbound time slot.

In a similar fashion, at step 409, the console 203 can optionally transmit outbound audio information via the outbound multiplexer to the outbound audio switch and outbound time slot, each as identified in the communication request. In allowing the console 203 to specify the inbound and outbound time slots, as well as the required audio switches and multiplexers, the present invention eliminates the need for the console 203 to have access to all time slots, thereby simplifying operation of the zone controller and the console.

Figure 5:
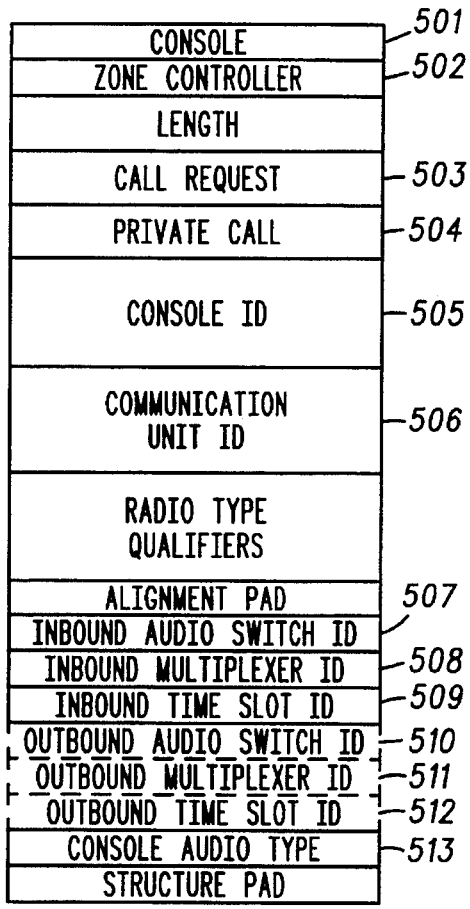
FIG. 5 illustrates an exemplary communication request for a private call in accordance with the present invention.
Figure 6:
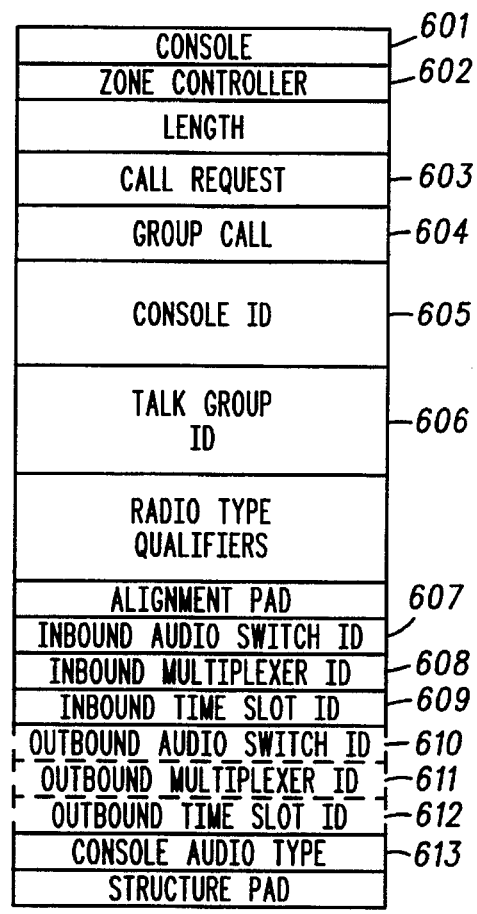
FIG. 6 illustrates an exemplary communication request for a group call in accordance with the present invention.

FIGS. 5 and 6 show exemplary communication requests for a private call and a group call, respectively. As shown in FIGS. 5 and 6, both types of communication requests include an inbound audio switch identification 507, 607, an inbound multiplexer identification 508, 608, an inbound time slot identification 509, 609, and optionally, an outbound audio switch identification 510, 610, an outbound multiplexer identification 511, 611, and an outbound time slot identification 512, 612 as discussed above. In a first embodiment of the present invention outbound audio switch identification 510, 610, outbound multiplexer identification 511, 611, and outbound time slot identification 512, 612 are not used and are assumed to have the same values as the corresponding inbound identifications. However, in a second embodiment of the present invention, the outbound identifications are provided.

Furthermore, the communication requests of FIGS. 5 and 6 both include the following information: a source type 501, 601 indicates that the communication request is from a console device; a destination type 502, 602 indicates that the communication request should be processed by the zone controller; a command type 503 specifies that the packet is a communication request; a service type 504, 604 indicates that the communication request is for a private call (i.e., to a particular communication unit) or for a group call, respectively; a calling entity identification 505, 605 identifies the particular console operator position making the communication request; and a target entity identification 506, 606 identifies the particular communication unit or talk group, respectively, the calling entity wishes to communicate with.

Finally, the communication request shown in FIGS. 5 and 6 include special attributes referred to as radio type qualifiers which should be applied to the call. For both group calls and private calls, these attributes indicate what type of console operator position is making the request and whether the requested communication request should be encrypted. For group calls only, these attributes further indicate whether the requested communication is an emergency group request, a mulitgroup request, or a normal talk group request.

With the present invention, a method that allows a console to establish a communication in the wireless communication system is provided. A communication request generated by the console indicates those time slots to be used for the receipt and transmission of audio information. Prior art systems require that the console position have complete access to all audio present on the communication system, i.e., all time slots. This results in an inefficient utilization of system resources. The present invention requires the console position requesting a communication to indicate, in the communication request, those inbound, and optionally, outbound, resources required for the requested communication. In this manner, only the necessary audio information being routed to the console position is received, and control of the system, as performed by the zone controller, is simplified.

We claim:

1. In a wireless communication system that includes a plurality of communication units and a console in communication with a zone controller, a method for the console to establish a communication between the console and at least one communication unit of the plurality of communication units, the method comprising the steps of:

a) sending a communication request comprising a target entity identification, a calling entity identification, and an inbound time slot identification to the zone controller; and b) responsive to the communication request, receiving, from the zone controller, a communication request acknowledgment that confirms establishment of the communication.

2. The method of claim 1, step (a) further comprising the step of sending :the communication request, the communication request comprising a console audio type.

3. The method of claim 2, step (a) further comprising the step of sending the communication request, the communication request comprising an outbound time slot identification.

4. The method of claim 1, further comprising the step of:

c) receiving inbound audio information via an inbound time slot corresponding to the inbound time slot identification.

5. The method of claim 1, further comprising the step of:

c) receiving a communication request denial when an inbound audio resource corresponding to the inbound time slot identification is not available.

6. In a wireless communication system that includes a plurality of communication units and a console in communication with a zone controller, a method for the zone controller to establish a communication between the console and at least one communication unit of the plurality of communication units, the method comprising the steps of:

a) receiving a communication request comprising a target entity identification, a calling entity identification, and an inbound time slot identification from the console; and b) responsive to the communication request, sending, to the console, a communication request acknowledgment that confirms establishment of the communication.

7. The method of claim 6, step (a) further comprising the step of receiving the communication request, the communication request comprising a console audio type.

8. The method of claim 7, step (a) further comprising the step of receiving the communication request, the communication request comprising an outbound time slot identification.

9. The method of claim 6, further comprising the step of:

c) responsive to the communication request, sending a communication request denial to the console when an inbound time slot corresponding to the inbound time slot identification is not available.

10. In a wireless communication system that includes a plurality of communication units, a console in communication with a zone controller via a communication link, an audio switch in communication with the zone controller, and a multiplexer in communication with the audio switch and the console, a method for establishing a communication between the console and at least one communication unit of the plurality of communication units, the method comprising the steps of:

a) sending, by the console, a communication request comprising a target entity identification corresponding to the communication unit, a calling entity identification corresponding to the console, and an inbound time slot identification to the zone controller via the communication link;

b) responsive to the communication request, sending, by the zone controller to the console via the communication link, a communication request acknowledgment that confirms establishment of the communication; and c) receiving, by the console via the audio switch and the multiplexer, inbound audio information from the communication unit in an inbound time slot corresponding to the inbound time slot identification.

11. The method of claim 10, step (a) further comprising the step of sending the communication request via the communication link, the communication link comprising an Ethernet link.

12. The method of claim 11, step (a) further comprising the step of sending the communication request, the communication request further comprising an inbound audio switch identification and an inbound multiplexer identification.

13. The method of claim 12, step (a) further comprising the step of sending the communication request, the communication request further comprising an outbound time slot identification corresponding to an outbound time slot.

14. The method of claim 13, further comprising the step of:

d) sending, by the console via the audio switch and the multiplexer, outbound audio information to the communication unit in the outbound time slot.

15. The method of claim 13, step (a) further comprising the step of sending the communication request, the communication request further comprising an outbound audio switch identification and an outbound multiplexer identification.

16. In a wireless communication system that includes a plurality of communication units arranged into a plurality of talk groups, a console in communication with a zone controller via a communication link, an audio switch in communication with the zone controller, and a multiplexer in communication with the audio switch and the console, a method for establishing a communication between the console and at least one talk group of the plurality of talk groups, the method comprising the steps of:

a) sending, by the console, a communication request comprising a target entity identification corresponding to the talk group, a source entity identification corresponding to the console, and an inbound time slot identification to the zone controller via the communication link;

b) responsive to the communication request, sending, by the zone controller to the console via the communication link, a communication request acknowledgment that confirms establishment of the communication; and c) receiving, by the console via the audio switch and the multiplexer, inbound audio information from the talk group in an inbound time slot corresponding to the inbound time slot identification.

17. The method of claim 16, step (a) further comprising the step of sending the communication request via the communication link, the communication link comprising an Ethernet link.

18. The method of claim 17, step (a) further comprising the step of sending the communication request, the communication request further comprising an inbound audio switch identification and an inbound multiplexer identification.

19. The method of claim 18, step (a) further comprising the step of sending the communication request, the communication request further comprising an outbound time slot identification corresponding to an outbound time slot.

20. The method of claim 19, further comprising the step of:

d) sending, by the console via the audio switch and the multiplexer, outbound audio information to the talk group in the outbound time slot.

21. The method of claim 19, step (a) further comprising the step of sending the communication request, the communication request further comprising an outbound audio switch identification and an outbound multiplexer identification.

* * * * *